United States Patent [19]

Strasser et al.

[11] Patent Number: 5,141,096
[45] Date of Patent: Aug. 25, 1992

[54] DEVICE FOR CONVEYING PIECE GOODS

[75] Inventors: Karl-Heinz Strasser, Berg bei Ravensburg; Martin Röck, Tettnang, both of Fed. Rep. of Germany

[73] Assignee: Handtmann A-Punkt Automation GmbH, Baienfurt, Fed. Rep. of Germany

[21] Appl. No.: 715,412

[22] Filed: Jun. 14, 1991

[30] Foreign Application Priority Data

Jul. 28, 1990 [DE] Fed. Rep. of Germany ....... 4024037

[51] Int. Cl.⁵ .......................................... B65G 47/24
[52] U.S. Cl. ................................. 198/411; 198/454
[58] Field of Search ............ 198/411, 454, 455, 419.3, 198/626.5, 834, 836.3

[56] References Cited

U.S. PATENT DOCUMENTS

| | | |
|---|---|---|
| 1,109,259 | 9/1914 | Sons et al. .................. 198/626.5 X |
| 1,811,201 | 6/1931 | Kleineberg .................. 198/626.5 |
| 2,941,654 | 6/1960 | Falconer ..................... 198/455 |
| 3,040,866 | 6/1962 | Rehm ....................... 198/454 X |
| 3,190,434 | 6/1965 | Dardaine .................... 198/419.3 |
| 4,054,201 | 10/1977 | Rollinger ................... 198/455 |
| 4,072,062 | 2/1978 | Marling et al. .............. 198/834 |
| 4,085,839 | 4/1978 | Crawford ................... 198/411 X |
| 4,767,116 | 8/1988 | Eberle ..................... 198/626.5 X |

*Primary Examiner*—Joseph E. Valenza
*Assistant Examiner*—Tuan N. Nguyen
*Attorney, Agent, or Firm*—Robert W. Becker & Associates

[57] ABSTRACT

A device for conveying piece goods to a transfer station is provided whereby the device has a drivable continuous conveyor belt with at least one endless guide belt that is provided parallel to a longitudinal direction of the conveyor belt. A guiding surface of each one of the respective guide belts is disposed perpendicularly to a conveying surface of the conveyor belt and is synchronously drivable relative to a conveying direction of the conveyor belt. Due to this embodiment, very sensitive piece goods may be conveyed without the piece goods sliding off the conveyor belt and without damaging the piece goods at the guide belts that provide the lateral limitation of the conveying belt. A relative movement between the piece goods and the lateral limitation is prevented.

22 Claims, 4 Drawing Sheets

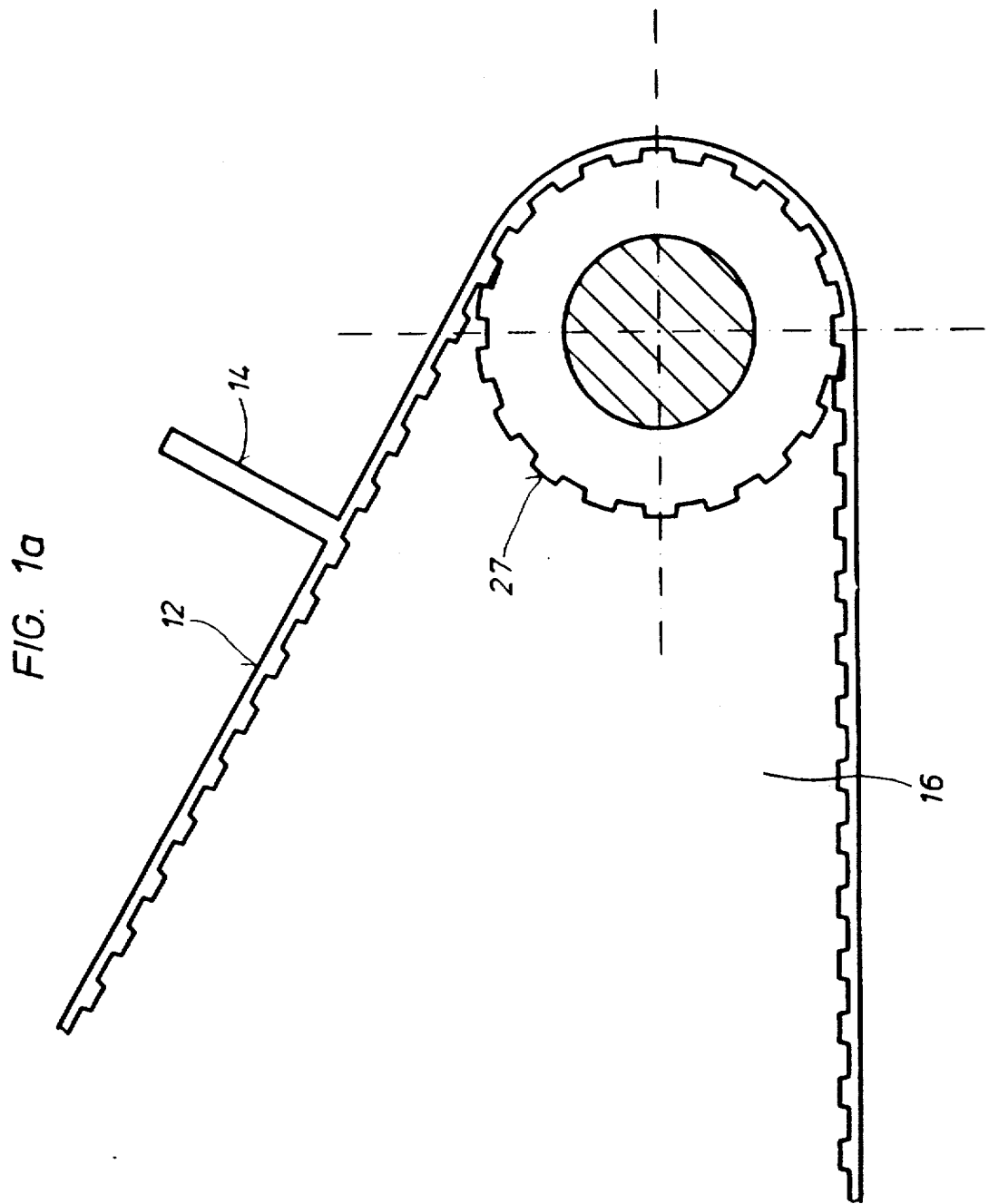

2

DEVICE FOR CONVEYING PIECE GOODS

BACKGROUND OF THE INVENTION

The present invention relates to a device for conveying piece goods, especially sausages or similar goods, with a drivable continuous conveyor belt to a transfer station.

In order to ensure that the piece goods to be transported with such conveying devices remain on the conveying belt at all times the conveying belt is usually provided on one or both longitudinal sides with a limiting device. For this purpose, vertically extending plates are provided next to or above the conveying belt extending in its longitudinal direction. A lateral transport of the conveyed piece goods is thus prevented since these plates are fixedly attached. However, the piece goods often drag along these plates. This results in damages to the piece goods, especially when piece goods, that do not have a sturdy casing such as sausages, are conveyed. Accordingly, a high percentage of damaged goods must be discarded and elaborate and time consuming cleaning processes are necessary, so that in many cases operational shut down periods are necessary.

It is therefore an object of the present invention to provide a device for conveying piece goods of the aforementioned kind with which extremely sensitive piece goods may be reliably transported such that no undesired lateral transport takes place and the piece goods are not damaged at the lateral limiting devices. Without requiring an elaborate construction a device is to be provided with which no relative movement of the piece goods during their transport on the conveying belt with respect to the lateral limiting devices occurs so that a damage to the respective casing of the product is safely prevented. Furthermore, it should be possible to portion the respective piece goods already during the transport and to convey the resulting portioned piece goods safely to a downstream processing device.

BRIEF DESCRIPTION OF THE DRAWINGS

This object, and other objects and advantages of the present invention, will appear more clearly from the following specification in conjunction with the accompanying drawings, in which:

FIG. 1a is detail of FIG. 1 showing a toothed belt with a corresponding driving roller;

SUMMARY OF THE INVENTION

Figure 1:
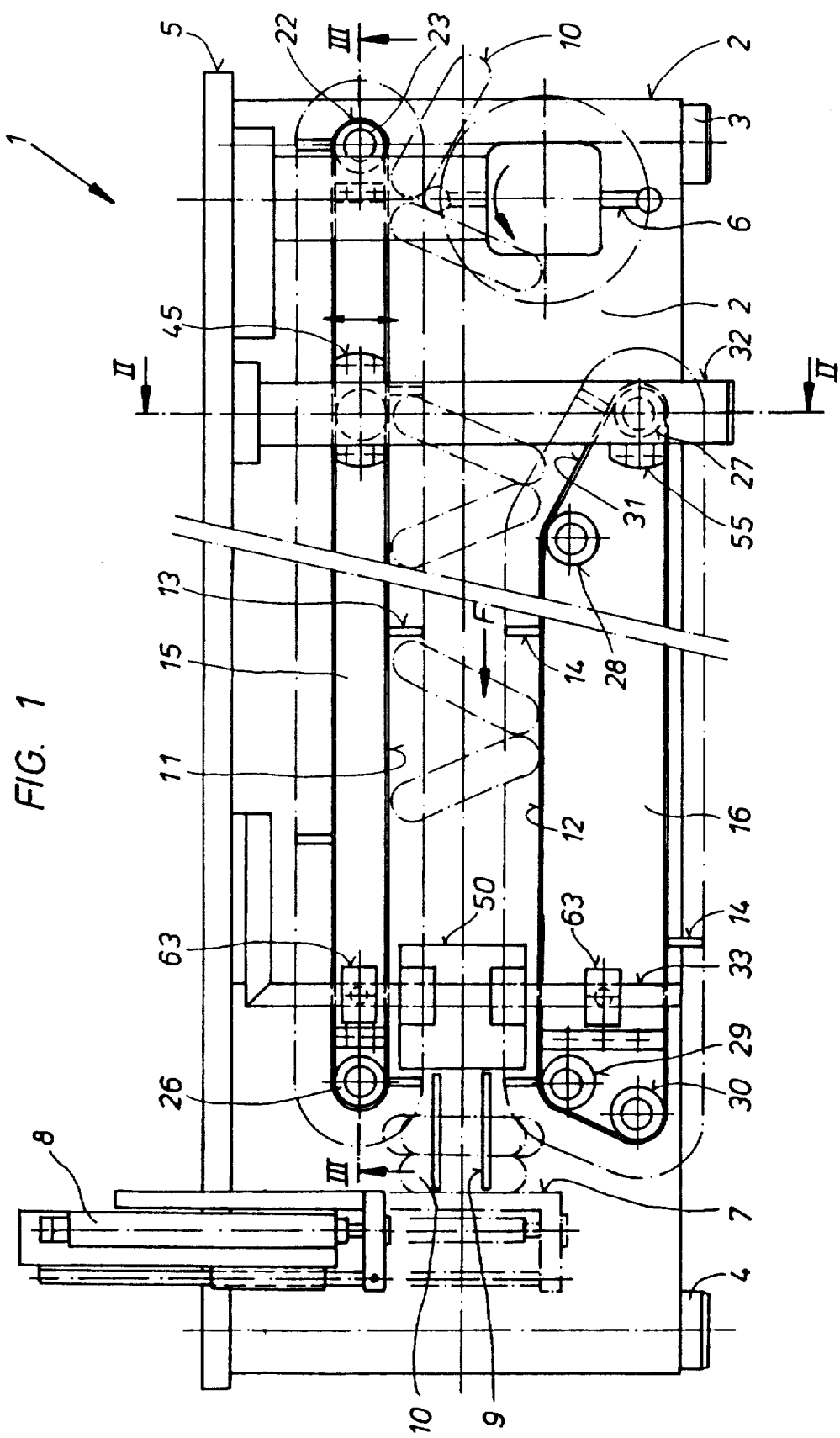
FIG. 1 is a plan view of the inventive conveying device.

The device for conveying piece goods of the present invention is primarily characterized by at least one endless guide belt being provided parallel to a longitudinal direction of the conveyor belt, whereby a guiding surface of each one of the respective guide belts is disposed perpendicularly to a conveying surface of the conveyor belt and is synchronously drivable relative to a conveying direction of the conveyor belt. Preferably, a first guide belt and a second guide belt are respectively provided on either side of the conveyor belt.

It is advantageous to provide each one of the guide belts with engaging members that are spaced at a distance from one another in a longitudinal direction of the respective guide belt and are positioned above the conveying surface of the conveyor belt.

In another embodiment each one of the guide belts is associated with a respective support rail that supports driving rollers and guide rollers whereby each one of the guide belts is guided around the respective driving rollers and the respective guide rollers. Furthermore, at least one of the respective support rails is provided with an insertion path that is slanted in the conveying direction of the conveyor belt.

Each one of the guide belts may be provided over the entire length of the conveying surface or may be provided over a portion of the length of the conveying surface. It is possible, to provide the guide belts in a continuous fashion or in a sectioned fashion. The guide belts may be provided in the form of an endless toothed belt whereby engaging members in the form of plates may be attached to the guide belts and may be extending in a direction perpendicular to the guiding surface. In a preferred embodiment, the plates are welded to the guide belt which is provided in the form of a toothed belt.

In another embodiment, the support rails are fastened to a mounting support via at least one holder that is arranged above the conveyor belt whereby the mounting plate is arranged parallel to the guide belts on one side of the conveyor belt. Preferably, the support rails are fastened to the mounting support in a detachable manner. It is preferred, that at least one of the guide belts is adjustable relative to a width of the conveyor belt in a direction perpendicular to the conveying direction, whereby it is advantageous that the guide belts are fastened in an adjustable manner via the holders.

In a further embodiment the guide belts are provided with guide rollers that are positioned at end sections of the support rails and are in a driving connection with a drive motor. The drive motor may be the drive motor of the conveyor belt or may be an additional drive motor. It is preferable that the driving connection between the guide rollers and the drive motor is achieved by providing one of the holders with a polygonal shaft on which bevel gears are disposed in a slidable manner. These beveled gears are drivably connected to further beveled gears. The drive connection between the bevel gears may be achieved in a direct manner or via an intermediate member. The intermediate member may be comprised of a toothed belt.

In order to be able to adjust the width of the conveyor belt so that the conveyed piece goods may be aligned during their transport it is also advantageous to provide one of the guide belts in a pivotably supported manner at the holder such that the respective guide belt is pivotable relative to the conveyor belt in a plane parallel to the conveying surface.

This may be achieved by providing a bushing in one end section of the support rail of one of the guide belts whereby the support rail is pivotably supported at the bushing and the bushing is slidable suspended, for example, via a pin, in the conveying direction of the conveyor belt at a bracket that is fastened to one of the holders.

When, according to the present invention, a device for conveying piece goods is provided with endless guide belts parallel to a longitudinal direction of the conveyor belt and perpendicular to a conveying surface of the conveyor belt, which guide belts are also synchronously drivable relative to a conveying direction of the conveyor belt and are provided with engaging members that are spaced at a distance from one another in the longitudinal direction of the guide belt, transporting of very sensitive piece goods is made possible. Since the outer guide belts are driven synchronously to the conveyor belt no relative movement occurs when the piece goods come into contact with the guide belts of the conveying device so that no friction occurs and the casing of the product to be conveyed will not be damaged. Damages to the piece goods and resulting negative effects such as shut down periods, cleaning processes of the conveying device and discarding of damaged goods are thus prevented. The inventive conveying device is thus especially suitable for conveying sausages.

Furthermore, due to the engaging members that are spaced at a distance from one another in a longitudinal direction of the respective guide belt the piece goods may be aligned and assembled to groups during the transport on the conveyor belt so that they are positioned in a predetermined orientation for the further transport and/or processing. Due to the engaging members the conveyor belt is divided into individual sections in which a piece goods group may be transported and aligned. Furthermore, the engaging members may also be used as transporting elements in order to convey the piece goods to a transfer station.

DESCRIPTION OF PREFERRED EMBODIMENTS

The present invention will now be described in detail with the aid of several specific embodiments utilizing FIGS. 1 through 3.

The device 1 represented in FIG. 1 serves for conveying piece goods, especially sausages 10 coming from a sausage making machine (sausages 10 are represented in a dash-dotted line). The sausages 10 are further transported via a lifting member 9 in a vertical direction. The device 1 comprises essentially an endless conveyor belt 2 that is arranged between the sausage making machine and the lifting member 9. The conveyor belt 2 is guided via guide rollers 3 and 4 that are supported at a mounting support 5. Above the conveyor belt 2, at its starting point, a distributing device 6 is arranged that is driven in a rotating manner. The distributing device 6 serves to align the sausages 10 perpendicular to a conveying direction F of the conveyor belt so that they may be received and transported by the lifting member 9 in a direction vertical to their axes. The lifting member 9 is provided with an abutment 7 that is adjustable via an adjusting cylinder 8 so that the conveyed piece goods may also be transferred to a further device downstream from the conveyor belt 2.

In order to prevent the sausages 10 that have been arranged perpendicular to the conveying direction by the distributing device 6 from sliding off the conveyor belt 2 during their transport limiting devices are provided on both sides of the conveyor belt 2 which comprise two endless guide belts 11 and 12 that are driven synchronously with respect to the conveyer belt 2. The guide belts 11 and 12 are disposed around support rails 15 and 16 which are suspended from holders 32 respectively 33 that are fastened to the mounting support 5 It is preferable to provide the guide belts 11 and 12 in the form of toothed belts that are provided with engaging pieces 13 and 14 in the form of plates welded to the toothed belt and positioned above the conveying surface of the conveyor belt 2. The engaging members 13, 14 are spaced at a distance from one another in the longitudinal direction of the respective toothed belt. With this engaging member arrangement, it is possible to portion the sausages 10 already during the transport on the conveyor belt 2.

For driving the conveyor belt 2 as well as the guide belts 11 and 12 a motor 34 is provided which is in a drivable connection via a toothed belt drive 35 with the shaft 3' of the guide roller 3. Via a further belt drive 36 that is provided with a tension roller 37 the shaft 3' is drivably connected to a shaft 38 which in return is coupled via a plug coupling 39 to a polygonal shaft 40 that is disposed at the holder 32 and aligned with the plug coupling 39. On the polygonal shaft 40, bevel gears 41 and 51 are slidably supported and are arrestable via screws 44 respectively 54. The bevel gears 41 and 51 engage bevel gears 42 respectively 52 that are arranged on shafts 43 respectively 53. The bevel gears 42 respectively 52 and the associated shafts 43 respectively 53 are supported via supports 45 respectively 55 at the C-shaped holder 32 which is closed at its bottom side by a cover 46.

Figure 3:
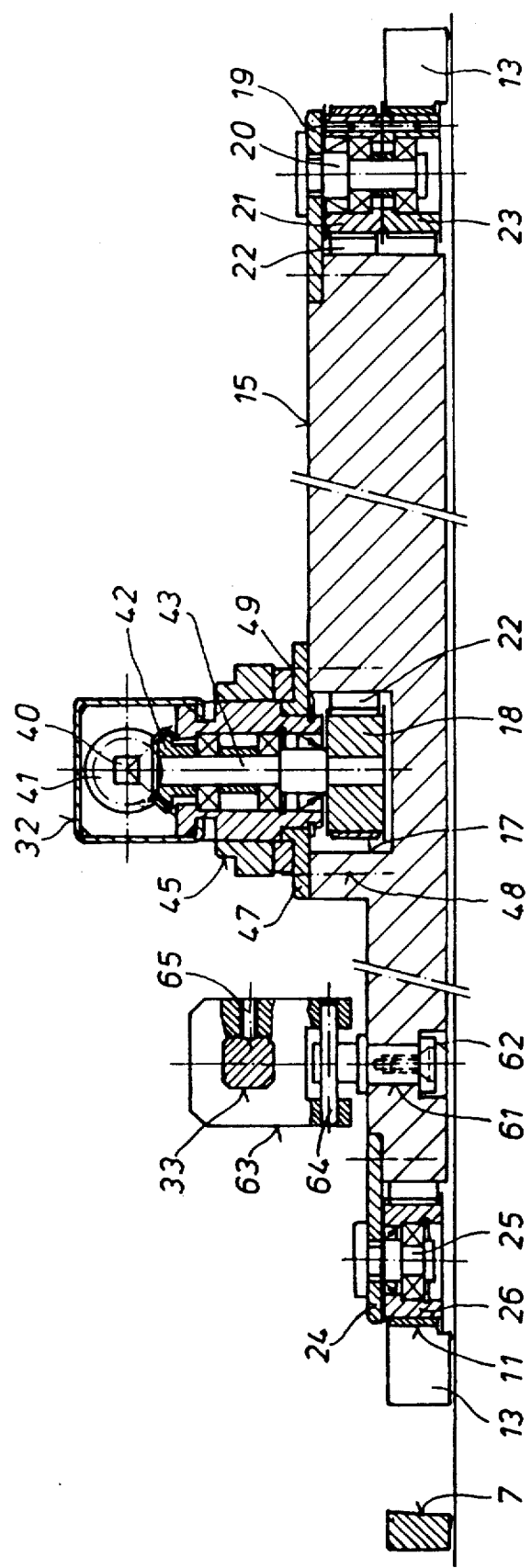
FIG. 3 is a cross-sectional view along the line III—III of FIG. 1.

Via the supports 45 and 55, as can be seen in FIG. 3 the support rails 15 and 16 are also suspended at the holder 32 whereby plates 47 that are attached to the supports 45 respectively 55 are fastened via screws 48 at the support rails 15 respectively 16 and are supported by spring rings 49 in the supports 45 respectively 55.

Figure 2:
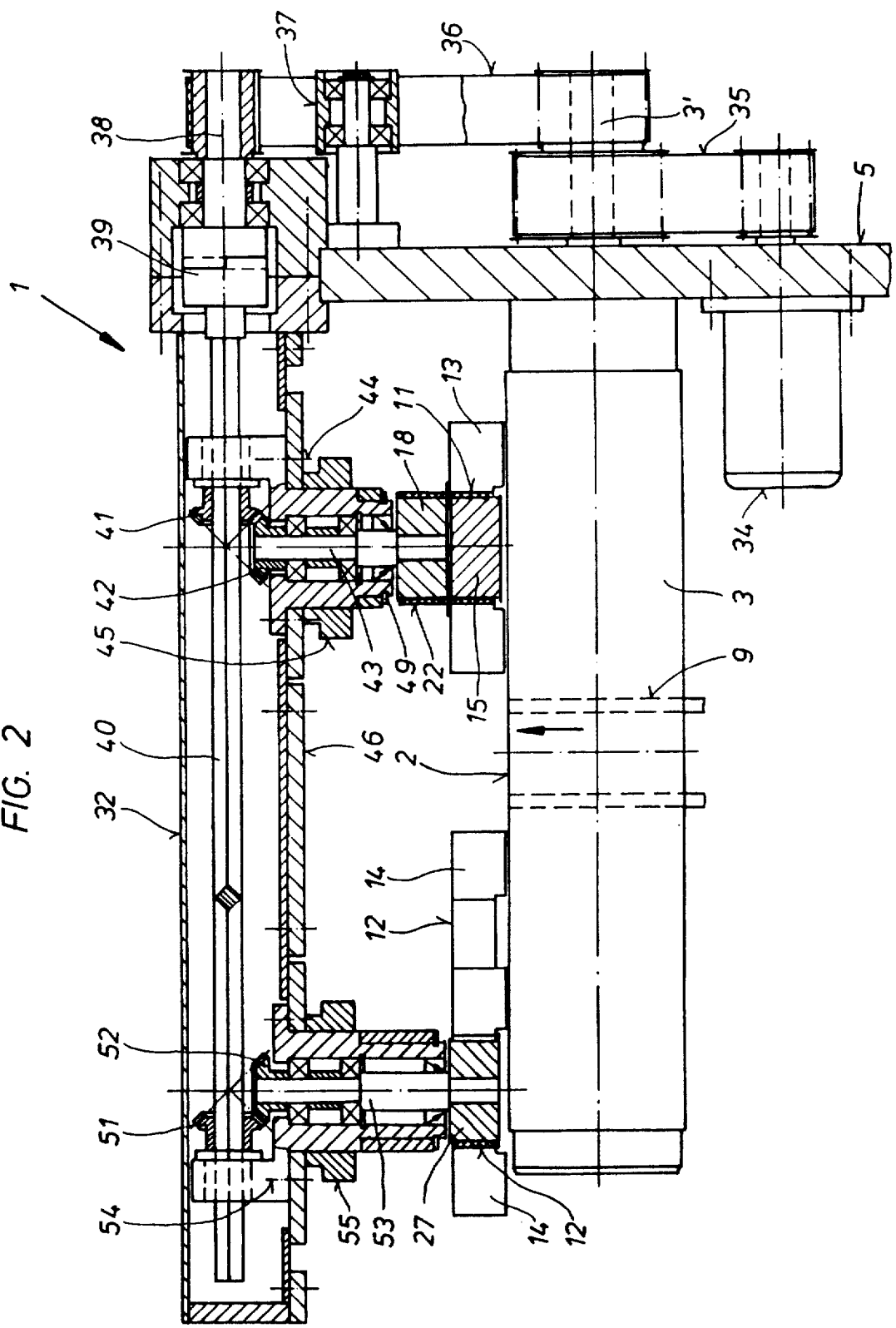
FIG. 2 is a cross-sectional view along the line II—II of the conveying device of FIG. 1.

As can be seen from FIGS. 2 and 3, a drive roller in the form of a toothed belt disk 18 is fixedly attached to the shaft 43 whereby the toothed belt disk 18 engages a recess 17 that is incorporated in the support rail 15. Via a toothed belt 22 the toothed belt disk 18 is in a drivable connection with a driving roller in the form of a toothed belt disk 21 that is rotatably supported at a shaft 20 which is fastened via a plate 19 to the support rail 15. Furthermore, a guide respectively driving roller 23 for the guide belt 11 is supported at the shaft 20 whereby the guide roller 23 is fixedly connected to the toothed belt disk 21. The guide roller 23 which is provided at one end of the support rail 15 is thus drivable by the motor 34 via the aforementioned gear members. At the other end of the support rail 15 a further guide roller 26 for the guide belt 11 is provided whereby the guide roller 26 is also rotatably supported at a shaft 25 that is supported at a plate 24.

The guide belt 12 is associated with a driving roller 27 that is connected in a fixed manner to the shaft 53 as well as with guide rollers 28, 29 and 30, which are supported at the support rail 16 in the same manner as the guide rollers 23 and 26 associated with the support rail 15. Furthermore, the support rail 16 is provided with an insertion path 31 that is slanted in the conveying direction F of the conveyor belt 2.

The sausages 10 that are fed to the conveyor belt in its conveying direction F are positioned perpendicular to the conveying direction via the distributing device 6 and are conveyed via the conveyor belt 2 to the lifting member 9. During this conveying step the sausages 10 are portioned by the engaging members 13 and 14 that are provided at the synchronously driven guide belts 11 and 12 of the conveying device, thus dividing the conveying belt into sections. Damaging of the sausages is prevented since no friction at the lateral limiting devices occurs. Also, the engaging members 13 and 14 serve to transport the sausages 10 into the immediate proximity of the abutment 7 so that an uninterrupted transfer to a further transporting container is ensured. A device 50 for holding down the sausages 10 is provided as a precaution which prevents that additional sausages are lifted by the lifting device.

When the screws 44 and/or 54 are loosened the bevel gears 41 and/or 51 and the associated components may be moved on the shaft 40 so that the inside width between the guide belts 11 and 12 may be adjusted to the size of the piece goods to be conveyed. Furthermore, for cleaning purposes of the conveyor belt 2 and/or the guide belts 11, 12, the holder 32 may be easily removed since it is coupled via the plug coupling 39 to the shaft 38.

The holder 33 may be removed in the same easy manner since the support rails 15 and 16, as is shown in FIG. 3, are suspended via a bracket 63 which is attached to the holder 33 via a screw 65.

Due to the bracket 63 the support rails 15 and 16 are slidable in a lateral direction but also pivotably supported. For this purpose a bushing 61 is provided on which the support rails 15 respectively 16 are pivotably supported via a screwed-on disk 62. Furthermore, the bushing 61 is slidably supported on a pin 64 that is inserted into the bracket 63 so that the support rails 15 respectively 16 may be pivoted relative to the supporting position at the holder 32 so that a constantly decreasing distance between the two guide belts 11 and 12 may be adjusted. The changing position of the bushing 61 resulting from a pivoting movement of the support rails 15 and/or 16 is compensated by sliding movements of the pins 64.

The present invention is, of course, in no way restricted to the specific disclosure of the specification and drawings, but also encompasses any modifications within the scope of the appended claims.

What we claim is:

1. A device for conveying piece goods to a transfer station, said device comprising:
   a drivable continuous conveyor belt with at least one endless guide belt being provided parallel to a longitudinal direction of said conveyor belt, whereby a guiding surface of said at least one respective guide belt is disposed perpendicularly to a conveying surface of said conveyor belt and is synchronously drivable relative to a conveying direction of said conveyor belt;
   a respective support rail supporting driving rollers and guide rollers, said guide belt being guided around said driving rollers and said guide rollers;
   a mounting support to which said support rails are fastened; and
   at least one holder arranged above said conveyor belt for fastening said support rails to said mounting support, with said mounting support being arranged parallel to said guide belts on one side of said conveyor belt.

2. A device for conveying piece goods according to claim 1, wherein a first said guide belt and a second said guide belt are respectively provided on either side of said conveyor belt.

3. A device for conveying piece goods according to claim 1, wherein said guide belt is provided with engaging members that are spaced at a distance from one another in a longitudinal direction of said guide belt and are positioned above said conveying surface of said conveyor belt.

4. A device for conveying piece goods according to claim 1, wherein at least one of said respective support rails is provided with an insertion path that is slanted in said conveying direction of said conveyor belt.

5. A device for conveying piece goods according to claim 1, wherein said guide belt is provided over a portion of a length of said conveying surface.

6. A device for conveying piece goods according to claim 1, wherein said guide belt is provided in a continuous fashion.

7. A device for conveying piece goods according to claim 1, wherein said guide belt is sectioned.

8. A device for conveying piece goods according to claim 1, wherein said guide belt is in the form of an endless toothed belt.

9. A device for conveying piece goods according to claim 3, wherein aid engaging members are in the form of plates that are attached to said guide belt and are extending in a direction perpendicular to a guiding surface thereof.

10. A device for conveying piece goods according to claim 9, wherein said plates are welded to said guide belt that is provided in the form of a toothed belt.

11. A device for conveying piece goods according to claim 1, wherein said support rails are fastened to said mounting support in a detachable manner.

12. A device for conveying piece goods according to claim 1, wherein at least one of said guide belts is adjustable relative to a width of said conveyor belt in a direction perpendicular to said conveying direction.

13. A device for conveying piece goods according to claim 12, wherein said guide belts are fastened to holders.

14. A device for conveying piece goods according to claim 11, wherein said guide belts are provided with guide rollers that are positioned at end sections of said support rails and are in a driving connection with a drive motor.

15. A device for conveying piece goods according to claim 14, wherein said drive motor drives said guide rollers and said conveyor belt.

16. A device for conveying piece goods according to claim 14, wherein for said driving connection between said guide rollers and said drive motor one of said holders is provided with a polygonal shaft on which bevel gears are disposed in a slidable manner, with said bevel gears being drivably connected to further bevel gears.

17. A device for conveying piece goods according to claim 16, wherein said bevel gears are in a direct driving connection with said further bevel gears.

18. A device for conveying piece goods according to claim 16, wherein said bevel gears are drivably connected to said further bevel gears via an intermediate member.

19. A device for conveying piece goods according to claim 18, wherein said intermediate member comprises a toothed belt.

20. A device for conveying piece goods according to claim 1, wherein at least one of said guide belts is pivotably supported at said holder such that said respective guide belt is pivotable relative to said conveyor belt in a plane of said conveying surface.

21. A device for conveying piece goods according to claim 20, wherein a bushing is provided in one end section of said support rail of said guide belt, on which bushing said support rail is pivotably supported, with said bushing being slidably suspended in said conveying direction of said conveyor belt at a bracket that is fastened to one of said holders.

22. A device for conveying piece goods according to claim 21, wherein said bushing is connected to said bracket via a pin.

* * * * *